United States Patent
Heitman

(10) Patent No.: US 6,609,330 B1
(45) Date of Patent: *Aug. 26, 2003

(54) METHOD AND APPARATUS FOR CONTROLLING FIRE ANTS

(76) Inventor: Lynn Byron Heitman, 6829 K Ave., Suite 112, Plano, TX (US) 75074

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/862,852

(22) Filed: May 23, 1997

Related U.S. Application Data

(63) Continuation-in-part of application No. 08/488,927, filed on Jun. 9, 1995, now Pat. No. 5,632,115.

(51) Int. Cl.⁷ ............................ A01M 1/02; A01M 1/22
(52) U.S. Cl. ........................................ 43/112; 43/132.1
(58) Field of Search .................. 43/112, 124, 132.1, 43/98

(56) References Cited

U.S. PATENT DOCUMENTS

| | | | | |
|---|---|---|---|---|
| 4,048,746 A | * | 9/1977 | Dye | 43/98 |
| 4,839,984 A | * | 6/1989 | Saunders et al. | 43/112 |
| 4,914,854 A | * | 4/1990 | Zhou et al. | 43/112 |
| 4,949,500 A | * | 8/1990 | Jefferys | 43/112 |
| 4,969,418 A | * | 11/1990 | Jones | 43/98 |
| 5,287,648 A | * | 2/1994 | Hand et al. | 43/121 |
| 5,473,836 A | * | 12/1995 | Liu | 43/124 |
| 5,632,115 A | * | 5/1997 | Heitman | 43/124 |
| 5,718,078 A | * | 2/1998 | Therrien | 43/121 |
| 5,732,503 A | * | 3/1998 | Cheng | 43/112 |
| 5,746,021 A | * | 5/1998 | Green | 43/131 |
| 6,018,904 A | * | 2/2000 | Lee | 43/112 |
| 6,134,826 A | * | 10/2000 | Mah | 43/112 |
| 6,223,464 B1 | * | 5/2001 | Nekomoto et al. | 43/112 |
| 6,283,064 B1 | * | 9/2001 | Djukastein et al. | 43/112 |

* cited by examiner

*Primary Examiner*—Darren W. Ark
(74) *Attorney, Agent, or Firm*—Gregory M. Howison; Howison & Arnott, LLP

(57) ABSTRACT

Method and apparatus for controlling fire ants. A method is disclosed for controlling colonies of fire ants in the environment. The method includes first providing a stimulating source that, when activated, will attract fire ants to contact the stimulating source and become agitated to a point that ants from a common colony will attack each other. Thereafter, the stimulating source is activated to cause the fire ants to cluster around the stimulating source, become agitated, and attack each other. The stimulated fire ants then are urged into a tightly confined space to exacerbate the attack reaction.

12 Claims, 4 Drawing Sheets

METHOD AND APPARATUS FOR CONTROLLING FIRE ANTS

CROSS REFERENCE TO RELATED APPLICATIONS

This application is a Continuation-in-Part of Ser. No. 08/488,927 filed Jun. 9, 1995 now U.S. Pat. No. 5,632,115, issued May 27, 1997.

TECHNICAL FIELD OF THE INVENTION

The present invention pertains in general to a method and apparatus for controlling fire ants, and more particularly, to a method and apparatus for controlling fire ants using electrical and mechanical stimulus methods.

BACKGROUND OF THE INVENTION

The continued proliferation of colonies of red imported fire ants *Solenopsis invicta* are becoming a serious problem in the United States. From their place of origin in Argentina and Brazil, they have spread from sea ports along the Gulf of Mexico across the Southeastern States of the USA from Texas to Florida and northward to a latitude along the southern border of Tennessee. They are playing havoc with many important utilities including electric power distribution and telecommunication systems as well as heating and air conditioning systems and traffic control systems. Fire ants are attracted to electrical circuits and they can cause failures in transformers, cables, connectors and related electrical hardware. They also pose a serious threat to livestock and small animals lying on the ground. Thousands of fire ants can cover a small animal on the ground and sting it repeatedly. The stings can cause a newborn calf to be blinded and die. Fire ants can also be very hazardous to people in the outdoors. It is very easy to step in or near a mound and be quickly covered with fire ants. They generally cause a localized allergic reaction on the area of the skin punctured by their stinging. Their sting is quite painful, and its effects can last for hours. Some individuals suffer a severe allergic reaction that can lead to anaphylactic shock, which can be fatal if not treated promptly. Small children and elderly people are particularly susceptible to serious injury from fire ants.

The control of fire ant colonies in the environment has been attempted through the use of insecticides that either kill the insects directly on contact or result in a disruption of their reproductive cycle. These chemicals are being used more extensively and they are beginning to pose a serious threat to the quality of ground water systems in highly concentrated population areas. The poisons that kill on contact only eliminate a small portion of the fire ants exposed on the surface of the ground. Many of these ants remain below ground, in the mound, and merely move to a new location and reestablish a new colony. Baits that result in a disruption of the fire ant's reproductive process are more effective in eliminating a colony, but they are slow to achieve results and recent experience indicates that the fire ants may be developing immunities to some of these chemicals that may reduce their long term effectiveness. A more recent idea involves importing a natural predator of the fire ant from its place of origin. The predator is a small gnat that lays it's eggs in the eyes of fire ants. Some experiments are being planned with its introduction in the USA, but the additional side effects of introducing yet another insect are unknown.

SUMMARY OF THE INVENTION

The present invention disclosed and claimed herein comprises a method and apparatus for controlling fire ants. This is accomplished by providing a stimulating source that when activated attracts and agitates fire ants to the point that ants from a common colony attack each other. Activating the stimulating source causes the fire ants to cluster around the stimulating source and attack each other. The stimulated fire ants are urged into a tightly confined space to exacerbate the attack reaction. An AC voltage, whose amplitude is low enough not to kill the ants or harm other beings, but high enough to disrupt the nervous systems of the ants to the extent that they attack one another, may be used as the stimulating source. A conical shaped container that extends downward to an apex may be used to force the stimulated fire ants closer together and thereby exacerbate the attack reaction. Periodic or continuous vibration applied in an area proximate to the stimulating source may be used to attract additional fire ants. The periodic vibration may be interrupted by the detection of frequency or amplitude variations in the stimulating source output caused by fire ants proximate to the stimulating source.

The stimulating source is provided across two conductive plates that are separated by a small insulating gap. The width of this gap is set such that a fire ant must touch both plates when attempting to cross the area. The plates are arranged in concentric circles around the inner edge of an open cone. One plate is mounted in a flat horizontal orientation that is parallel with the open end of the cone. The gap and the other plate are located on the sloping surface of the cone, which is made out of a non-conductive material. Plates may also be used on the tip of the cone and the outer rim of the cone that contacts the ground. This causes current flow through the ant mound. The opening of the cone is covered by an enclosure that contains solar cells, an electronics module(s) and an electro-mechanical module. The solar cells are operated in series to provide low voltage direct current which is converted to high voltage alternating current by an electronic module. The alternating current is used to drive the conductive plates. The low voltage direct current is also used to power an electro-mechanical module. This module uses an electronic circuit to monitor elapsed time and it periodically powers a small electric motor to produce mechanical vibration. The vibration is produced by a counterweight mounted on the motor shaft. The electro-mechanical module may also monitor the frequency or the amplitude of the alternating current to determine when fire ants are being stimulated and interrupt motor power when this process begins. This prolongs motor life and helps conserve power.

In another aspect of the present invention, fire ants are prevented from gaining access to a select area having a defined access path. This is accomplished by disposing a stimulating source in the access path that, when activated, attracts and agitates fire ants to a point that ants from a common colony will attack each other. When the stimulating source is activated, fire ants cluster around the stimulating source and fall away from the select area. An AC voltage, whose amplitude is low enough not to kill the ants or harm other beings, but high enough to disrupt the nervous systems of the ants to the extent that they attack one another, may be used as the stimulating source.

The stimulating source is provided across two parallel rings that are mounted on an insulator with a gap and the apparatus is attached around any select area having a defined access path. This includes a traffic electrical control box mounted on a pole, a telephone cable riser mounted on the ground, electric utility components mounted on a pole or a ground mounted electrical enclosure. Fire ants are attracted and agitated when the stimulating source is activated. They subsequently fall away from the select area. Fire ants that return are stimulated and fall again. This process prevents ants from reaching the select area and causing damage to equipment, personnel or property located in the select area. The stimulating source is powered by solar panels with battery backup for nighttime operation, by direct connection to available electrical power, or by inductive coupling to power circuits.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
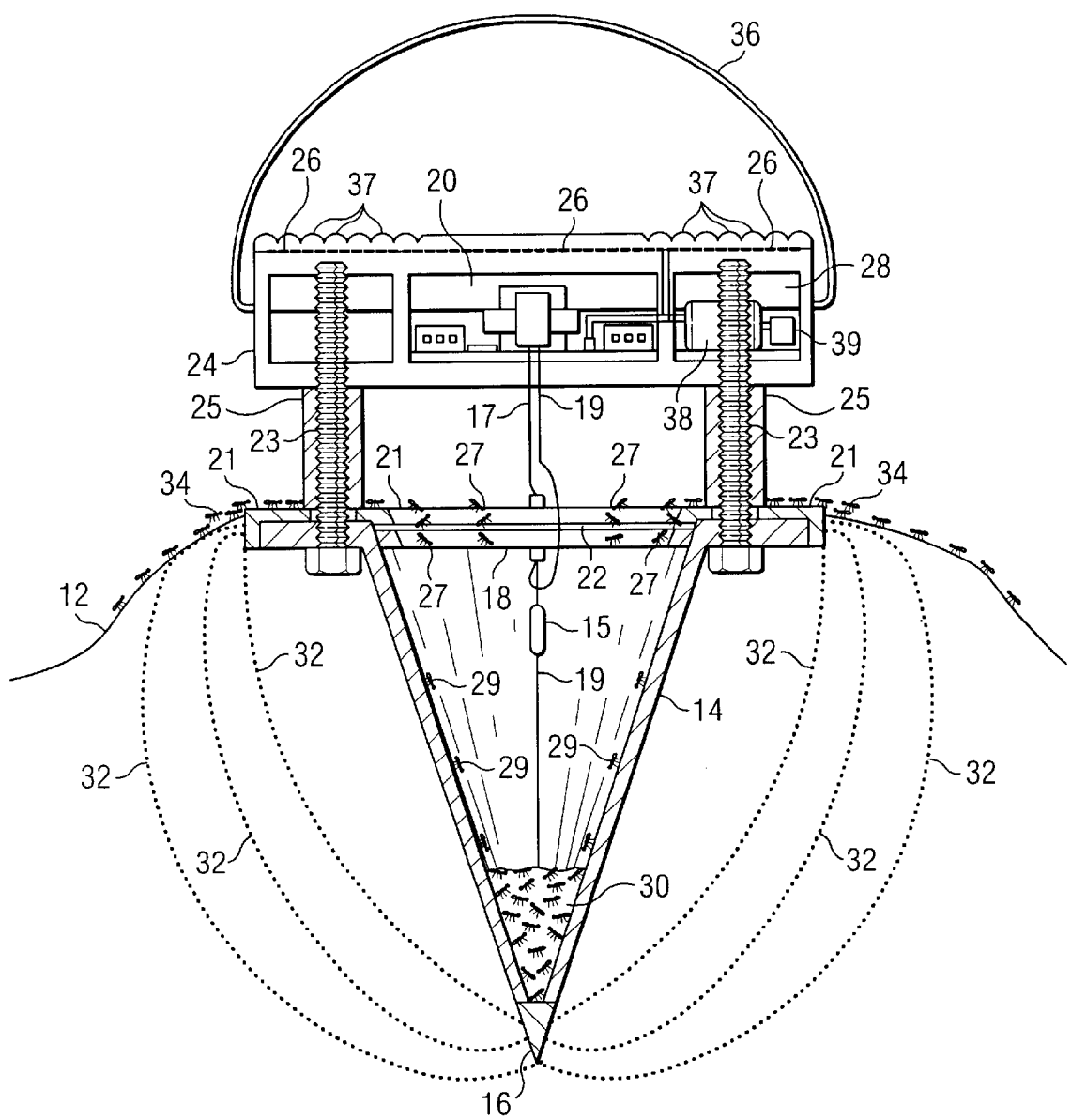
FIG. 1 is a cross-sectional view of a fire ant mound showing the system of the present invention.

Referring now to FIG. 1, there is illustrated a cross-sectional view showing one implementation of the system of the present invention installed in a fire ant mound 12. At the tip of the conical container 14 is a conductive outer conical surface 16 which is electrically connected via wire 19 and current limiting resistor 15 to a sloping plate 18 mounted on the inside wall of the container 14. The sloping plate 18 is also electrically connected via a wire 19 to the ground reference of the electronics module 20. The high voltage output of the electronics module 20 is electrically connected via wire 17 to another sloping plate 21 which is located in a concentric orientation with sloping plate 18 with a small open gap 22 located between the plates. The plate 21 also extends along the lip of the cone 14 and it covers the outer edge of the lip. Bolts 23 are used to hold the two halves of the watertight enclosure 24 together and to mount the container 14 to the enclosure 24 using spacers 25 to provide an opening for the fire ants to enter the system. The electronic module 20 and the electro-mechanical module 28 are powered by solar cells 26 and they may also be powered by battery power, wind generated power, or electric utility circuits which are not shown. The electric utility circuit connections may be either directly connected or inductively connected. The solar cells 26 convert sun light to low voltage direct current power. Concentric circular rings 37 composed of semicircle shaped lenses are used to gather sunlight when the sun is at a low elevation angle. The electronics module 20 converts the low voltage direct current power to high voltage alternating current power. This high voltage alternating current power is applied across the sloping electrical plates 18 and 21 with the gap 22 separating the plates. The high voltage alternating current power is also applied across the plate 21 and the conductive outer conical surface 16 with the soil providing a path for currents 32 to flow through the fire ant mound 12. Resistor 15 limits the amount of current that can be provided through this circuit. A bail handle 36 is provided to remove the system from the mound 12. Not shown in the figure is a depth scale that is used to measure the approximate number of fire ants that are contained in the enclosure. The scale consists of a series of numbers and tick marks on the sloping wall of the conical container.

In operation, the system is placed near a fire ant mound 12 and then pressed into the ground by applying force to the top surface of the enclosure 24 with one foot protected by a shoe or boot. The bail handle 36 is rotated to one side to allow easy access. The system is pressed into the mound 12 until the outer lip of the conical container 14 fully contacts the ground around the outer curved surface. The conical shape of the container 14 causes a collapse of the conical structure of rooms and tunnels beneath the surface of the ground in a typical fire ant mound. This action causes an immediate reaction of attacking fire ants that converge on the system and enter the open area surrounding the conical container 14. Fire ants entering the sloping area at the opening of the conical container 14 are standing on conical plate 21. They step across the open gap 22 and touch plate 18 whereupon an alternating current starts to flow through their bodies. After exposure to the current for a few minutes, these ants start to move in erratic motions and appear to enter a state of frenzy and begin stinging and biting anything that comes into contact with them. It is believed that the reaction of the fire ants to electrical stimulus is one of encountering a living prey. Fire ants typically hold onto their prey with their mandibles before initiating a rapid stinging sequence. This helps prevent them from being shaken off by their prey. All surfaces in the system are smooth, hard and difficult for the fire ants to grab with their mandibles. Using high magnification video recording cameras, they have been observed to grab and sting each other repeatedly. These ants form in clusters 27 near the energized plates. These clusters 27 and individual fire ants fall to the bottom of the conical container 14 and form an accumulation 30. The grabbing and stinging continues without any additional electrical stimulation. This is believed to be caused by the emission of a class of pheromones and/or toxins by the fire ants that cause them to fight. Inside the accumulation 30 of fire ants, the concentration of these chemicals increases rapidly. Those fire ants in the lower section of the conical container are covered by new layers of ants. The conical shape of the container 14 causes the ants to be forced closer together and helps accelerate the process. Some fire ants 29 escape the process and climb up the wall of the container 14 until they encounter plate 18 and plate 21, whereupon they are stimulated again and fall back into the accumulation 30. Fire ants are attracted to the container 14 by the currents 32 flowing into plate 21 and by periodic vibration produced by the electro-mechanical module 28. The electro-mechanical module 28 contains a timing circuit which controls a transistor switch to provide power to a direct current motor 38. The motor shaft contains a counterweight 39 which produces vibration when rotated.

Figure 2:
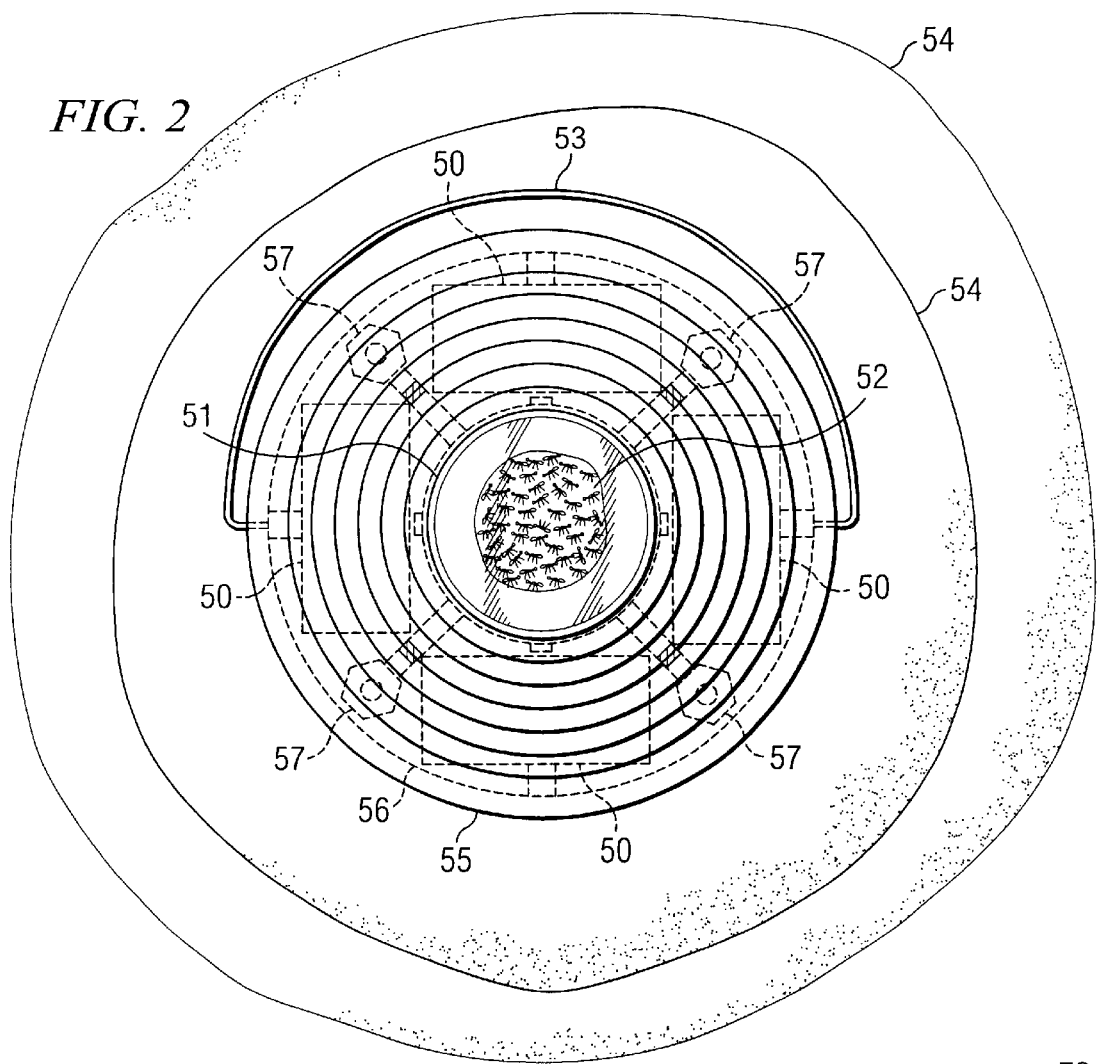
FIG. 2 is an overhead view that illustrates the arrangement of the solar panels and the viewing window.

Referring now to FIG. 2, there is illustrated an overhead view of the system located in a fire ant mound. Four rectangular solar cells 50 are arranged in a circular ring around the outer area of circular enclosure 55. The circular enclosure 55 also contains the electronic module and the electro-mechanical module which are located in compartments underneath two of the solar cells 50. Two additional compartments are located under the other two solar cells 50. These compartments may be used to house rechargeable batteries and/or additional electronics. The center of the circular enclosure contains a round viewing window 51, which is formed using clear plastic. The surfaces of this window 51 may be shaped as a convex lens to provide optical magnification as an aid in viewing activity and to concentrate sunlight. The concentrated sunlight acts to elevate the temperature inside the container and helps accelerate the effects of the pheromones and related chemicals. Shown through the clear window 51 is an accumulation of fire ants 52. The bail handle 53 is shown rotated to the top side of the of circular enclosure 55. The dotted lines 56 in the figure illustrate the structural walls of the enclosure that support the forces associated with insertion into the ground. They also show the location of the four bolts 57 that are used to hold the two halves of the enclosure 55 together. Also shown in the figure are constant height contour lines 54, which illustrate the sloping nature of ground heights around the fire ant mound.

Figure 3:
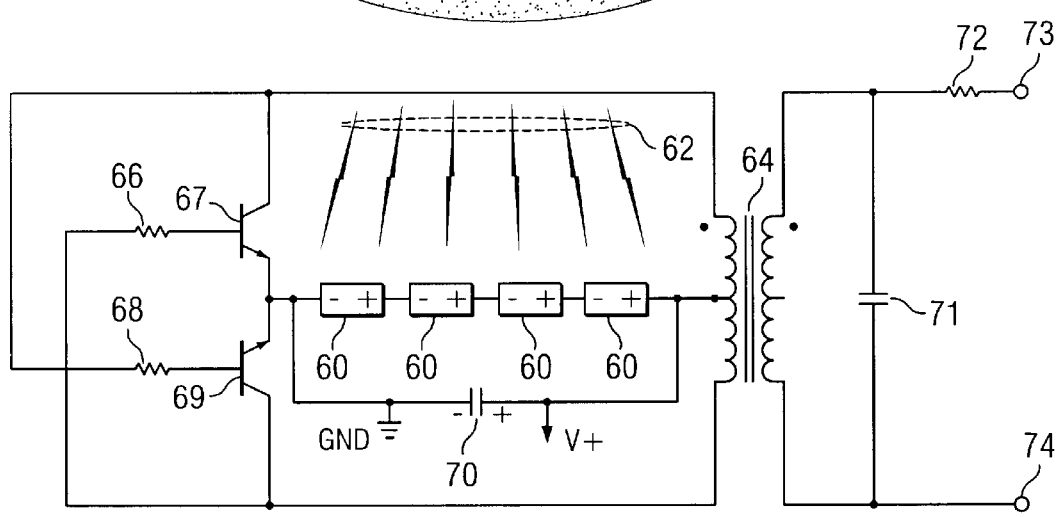
FIG. 3 illustrates the schematic diagram of the electronics module.

Referring now to FIG. 3, there is illustrated a schematic diagram of the electronics module. Four solar cells 60 are connected in series to provide a nominal voltage of about 2 Volts DC at a current of about 500 milliamperes for a total input power of about one watt. The intensity of sunlight 62 that strikes the solar cells 60 controls the voltage level. A electrolytic capacitor 70 is connected across the output. Alternatively, the solar cells may be used to charge rechargeable batteries or power storage capacitors which are in turn used to power the circuit. This allows the circuit to operate during periods of darkness. Other supplemental power sources include public utility circuits and wind-powered alternators. The positive output terminal voltage V+ is connected to the center tap in the primary of transformer 64. The V+ voltage is also supplied to electro-mechanical module. The ground terminal of the series of solar cells 60 is connected to the electro-mechanical module and to the emitters of transistor 67 and transistor 69. The bases of these power switching transistors are connected via resistor 66 and resistor 68 back to the end points of the primary of transformer 64. The secondary terminals of the transformer 64 are connected across a capacitor 71 and one terminal is connected to a resistor 72. The resistor 72 limits the output current to a few milliamperes.

In operation, the circuit functions as a combination resonant oscillator and DC to AC converter. The power switching transistors 67 and 69 are used in a common emitter configuration to switch ground across the primary terminals of transformer 64 with the center tap tied to the plus voltage V+. The base resistors 66 and 68 set the current required to place the transistors 67 and 69 in a saturated on-state. The transistor collector outputs are cross-connected to the base inputs to create the switching drive signal. The resonant frequency is controlled by the inductance of the transformer 64 combined with the capacitance of the transformer 64 and its reflected capacitive load which consists of the parallel plates and the conducive tip. Capacitor 71 is added across the transformer secondary terminals to set the primary output frequency of the resonant circuit. The circuit can operate in a frequency range of about one to twenty kilohertz. The AC switched voltages applied across the primary of the transformer 64 are stepped up by a high turns ratio transformer 64. The resultant AC output voltage across terminals 73 and 74 ranges from a low of about 30 Volts AC at sunrise and sunset to a high of about 70 Volts AC at mid-day. This output voltage is supplied via a current limiting resistor 72 which protects the circuit from overload. This output voltage is supplied across the plates and the conductive tip via a current limiting resistor which limits the current flowing through the ground during wet conditions.

Figure 4:
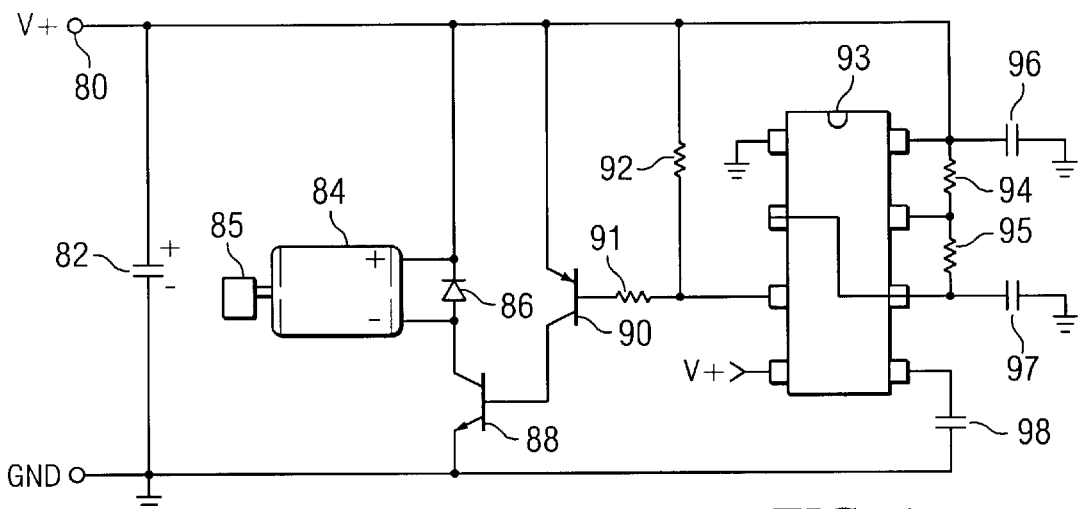
FIG. 4 illustrates the schematic diagram of the electro-mechanical module.

Referring now to FIG. 4, there is illustrated a schematic diagram of the electro-mechanical module. The circuit derives its power from the solar cells via the V+ and ground terminals. An electrolytic capacitor 82 is connected across the input power terminals. The plus voltage terminal 80 is connected to the plus terminal of the motor 84. A diode 86 is connected across the motor 84 power input terminals. The negative terminal of the motor 84 is connected to the collector of transistor 88 and the emitter is connected to circuit ground. The base of transistor 88 is connected to the collector of transistor 90. The emitter of transistor 90 is connected to the V+ bus and the base is connected via resistor 91 to the output of the timing chip 93. The output is also connected through resistor 92 to the V+ bus. The input power pin of the timing chip 93 is connected to the V+ bus. Timing resistor 94 is connected from the V+ bus to the discharge input of the timing chip 93. Timing resistor 95 is connected from the discharge input to the threshold input of the timing chip 93. Timing capacitor 97 is connected from the threshold input of timing chip 93 to ground. Power decoupling capacitor 96 is connected across the input power terminals of timing chip 93. Noise filtering capacitor 98 is connected across the control input of the timing chip 93.

In operation, the low voltage timing chip 93 is operated as a long period multivibrator. Capacitor 98 charges through resistor 94 and resistor 95 to the trigger voltage level and then discharges through resistor 95 only to the threshold voltage level. The output is high during the charging cycle and low during the discharge cycle. The duty cycle is controlled by the resistors 94 and 95 and the capacitor 97. Typical low periods are set to be on the order of a few minutes and high periods are typically set for periods of 20 minutes to one hour. A low output allows a small amount of current to be sinked by the timing chip 93 at its output terminal. This causes transistor 90 to be turned on by pulling current from the base of the transistor. Resistor 91 is selected to assure that transistor is in a saturated on-state. Resistor 92 is selected to make sure transistor 90 turns off when the timer chip output is in the high state. A saturated transistor 90 supplies current into the base of transistor 88 which turns on and supplies a ground to motor 84 via its collector and emitter which is connected to ground. The diode 86 protects the electronics against inductive spikes generated by the motor 84. Transistor 88 is turned off when transistor 90 returns to the off state under control of the timing chip 93 output. The motor is turned on for a few minutes at intervals up to one hour apart. Vibration is produced by the action of the counterweight 85 rotating on the end of the motor 84 shaft. The vibration is coupled from the electro-mechanical module to the enclosure 24 and through the spacers 25 and bolts 23 to the conical container. The motion of the conical container couples to the surrounding ground in and around the fire ant mound. This periodic vibration causes the fire ants to attack in successive waves until virtually no defenders are left in the mound.

The number of fire ants feeding on the plates affect the resistive and capacitive loading on the resonant circuit used in the electronics module. These changes cause variations in the output frequency. An alternative motor control option not shown, involves monitoring the output frequency or the output amplitude for variations and interrupting the motor power once feeding activity begins. The electronics, which are not shown, use traditional frequency or amplitude detectors that produce a signal output that can be used to interrupt motor power.

Figure 5:
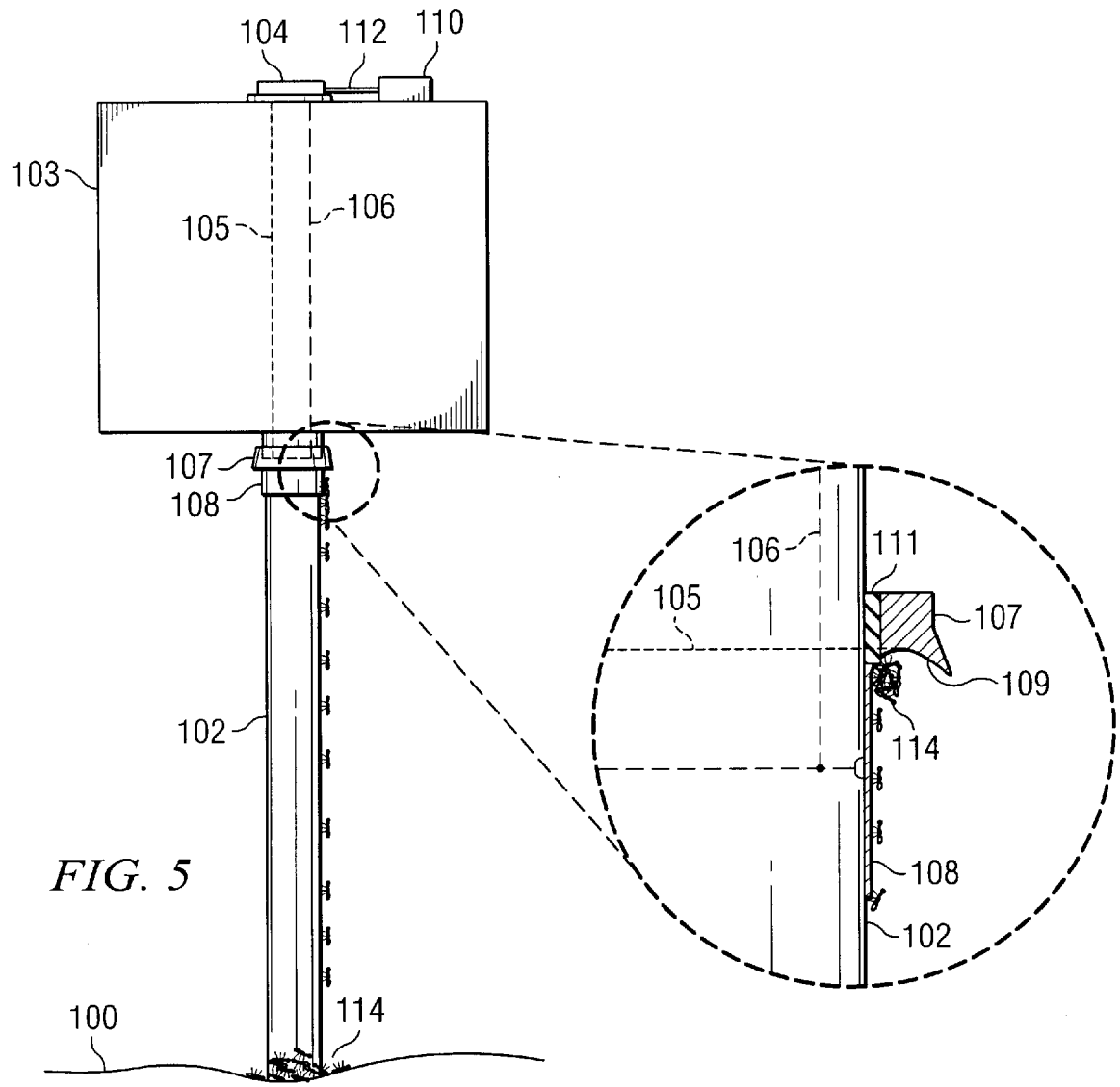
FIG. 5 illustrates the traffic control pole configuration.

Referring now to FIG. 5, there is illustrated a pictorial diagram of an alternative configuration of the system that is designed to keep fire ants out of electrical control boxes such as those used in traffic control. The control electronics are normally mounted in an electrical enclosure 103 and mounted on a pole 102 in the ground 100 at a convenient working height. An enclosure 104, containing an electronic module, is connected by cable 105 to an insulating collar 107 that contains a conductive surface 109. An insulator 111 of uniform thickness is installed between the collar 107 and the pole 102. The electronic module is also connected to a conductive ring 108 by cable 106.

In operation, solar cells located in the electronic module 104 produce direct current which is used to charge a separate battery 110 via cable 112. The battery 110 supplies power to the electronic module 104 during periods of darkness. The electronic module produces an AC output voltage which is applied across a conductive ring 108 and a flexible conductive surface 109 which is located on a curved surface of an insulating collar 107 in an area that is protected from the elements. The location also offers some protection from casual contact by people that are working on the equipment. The insulating collar can be made from any flexible material such as rubber that can be shaped to fit curve surfaces. The flexible material is resistant to ultraviolet light and weather damage. Not shown is a protective outer collar made of a rigid material such as plastic or metal that is placed over the upper surface and the sides of collar 107. The rigid member is attached to the pole to provide mechanical protection for the soft flexible surface. If the collar is conductive, it can connected to the conductive ring 108 to provide an additional conductive surface adjacent to the flexible conductive surface 109 at it outer periphery. The flexible conductive surface is made by coating or impregnating the flexible surface with an electrically conductive material such as an elastomer that contains nickel, silver or graphite. The cable 105 is bonded to the surface using the same material. Cable 105 is connected to a conductive ring 108 which is made of a flexible conductive polymer film or a thin metal foil with an adhesive backing. The insulating collar 107 may also be made of a rigid insulating material that is manufactured to fit the application. It may be coated with a conductive material or plated and it may be constructed with a layer of conductive plastic to form a rigid conductive surface 109. The conductive ring 108 may be formed by using a section of the bare metal pole 102 that is unpainted or it may be constructed of a rigid conductive material that is attached around the pole.

Fire ants are attracted to the control electronics and attempt to reach them by climbing from the ground 100 up the pole 102 toward the electrical enclosure 103. When they reach the conductive ring 108 they proceed onward toward the insulating collar 107 and they encounter the conductive surface 109. Touching the conductive surface while standing on the conductive ring stimulates the fire ants and causes them to grab and sting each other repeatedly and to form in clusters 114 and to fall from the pole to the surface of the ground 100 in an area near the pole. The clusters 114 also form near the base of the pole. Some ants proceed up the pole for additional attempts to reach the control electronics. They are subsequently removed from the pole by the same process. This process continues until all ants are eliminated.

Figure 6:
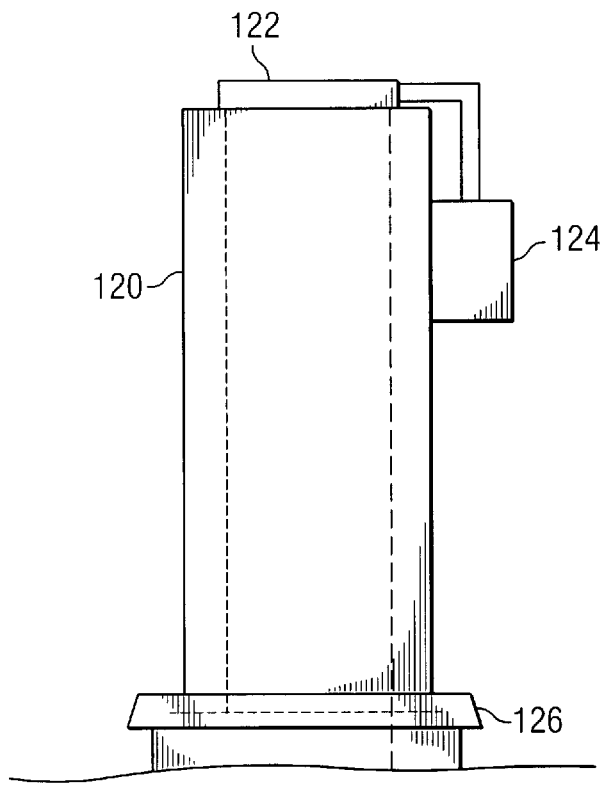
FIG. 6 illustrates the telephone cable riser application.

Referring to FIG. 6, there is illustrated a typical telephone application. A telephone cable riser 120 is mounted directly on the ground above the underground telephone cable which is not shown. The cable riser provides a connection point for customer telephone cables. Fire ants are attracted to the electrical signals inside these enclosures. An enclosure 122 containing an electronic module as described above which is connected by cables to an insulating collar, insulator and conductive ring assembly 126 as described above. These flexible components are shaped to conform to the riser 120 which is rectangular in shape. A rechargeable battery 124 is connected by cables to the electronics module inside the enclosure 120. The battery provides for operation in darkness. The system may also be powered from the 48 volt DC power that is provided on the telephone cables. This power may be taken from an unused pair or stolen in smaller amounts from multiple used pairs. The system operates in a fashion as described above.

Figure 7:
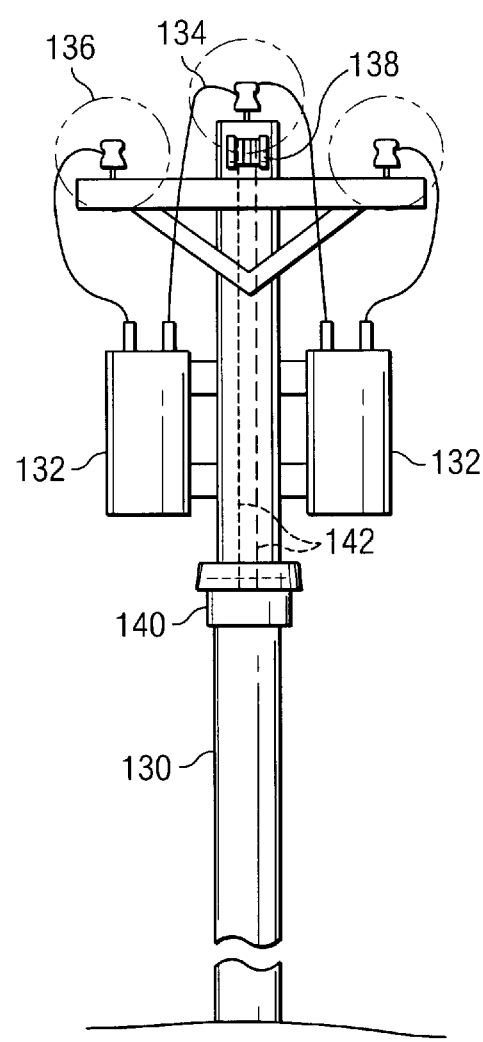
FIG. 7 illustrates the electric utility pole application.

Referring to FIG. 7, a utility pole 130 that contains power transformers 132 connected to high voltage power transmission wires. Three phase power transmission methods using three (delta method as shown in the figure) or four (Y-method) wires are used to transmit power. A single phase 134 is selected as a power source which provides an AC magnetic field 136 and a electric coil 138 is mounted in close proximity to this single phase such that an AC voltage is induced across the output of the coil 138 and connected to the combination collar, insulator and conductive ring 140 via cables 142. This configuration does not use any other electronics and does not require any direct electrical connection to the power lines. This provides reduced cost and makes widespread usage economically feasible. Reliability is enhanced by avoiding direct power line connections, which are often prone to lightning damage. The system operates in a fashion as described above with the exception that its frequency is reduced to the prevailing power frequency of either 60 or 50 Hertz.

Figure 8:
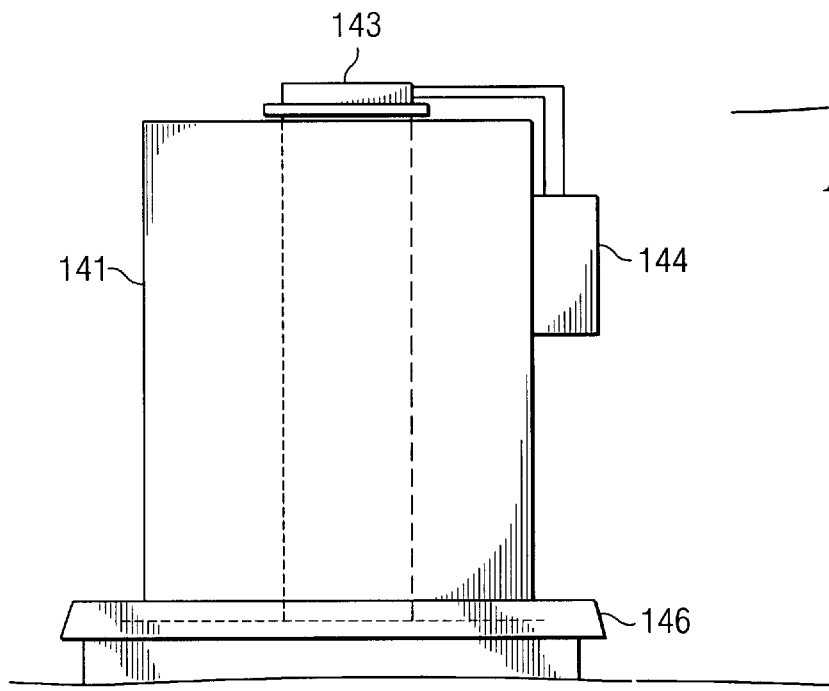
FIG. 8 illustrates the ground-mounted electrical enclosure application.

Referring to FIG. 8, a ground-mounted electrical enclosure 141 is used to contain power transformers or any other type of electrical components. An enclosure 143 containing an electronic module as described above which is connected by cables to an insulating collar, insulator and conductive ring assembly 146 as described above. These flexible components are shaped to conform to the enclosure 141 which is rectangular in shape. A rechargeable battery 144 is connected by cables to the electronics module inside the enclosure 143. The battery provides for operation in darkness. The system operates in a fashion as described above. The system may also be powered continuously using either a direct connection to the AC power circuits or an inductive pickup as described above.

Although the preferred embodiment has been described in detail, it should be understood that various changes, substitutions and alterations can be made therein without departing from the spirit and scope of the invention as defined by the appended claims.

EXPERIMENTAL RESULTS

Referring now to FIG. 1, there is illustrated a cross-sectional view showing one implementation of the system of the present invention installed in a fire ant mound 12. The following experiments have been conducted with a prototype device that has been constructed as shown in FIG. 1.

1) The device used in this experiment did not have a vibration module 28 and it did not contain a conductive outer conical surface 16 at the tip of the cone. It was placed in a fire ant mound 12 measuring approximately 24 inches in diameter and approximately 10 inches high. The device was operated for approximately 24 hours continuously by using floodlights during darkness. A conical container 14 that is approximately 6 inches deep was filled with dead fire ants in this period of time. The number of ants in a small sample were counted and the number of ants per unit of volume was calculated. Using the total volume of the container 14, the estimated contents was calculated as approximately 100,000 fire ants. All signs of mound activity disappeared within three weeks after treating the mound. Other smaller mounds located within about 10 feet of the treated mound remained active and did not change in size. No new mounds were noted in the adjacent area.

2) The device as shown in FIG. 1 with a conductive outer conical surface 16 at the tip and a vibration module 28 was operated in smaller mounds measuring from 6 inches to 12 inches in diameter. These were younger mounds with smaller surface height accumulations of approximately one inch or less of soil. These mounds were located in an open field that is about 1 acre in size. Ten mounds were treated by one device over a two week period. The device was left in each mound for a period that ranged from 1 to 2 days each. The device was checked and emptied each day. The dead ants were dumped back into the conical hole and the device was reinserted into the mound. The device did not contain a backup battery and consequently was operated using sunlight only.

Referring now to FIG. 5, there is illustrated a cross-sectional view showing one implementation of the system of the present invention installed in a traffic control pole configuration near a fire ant mound. The following experiment has been conducted with a prototype device that has been constructed as shown in FIG. 1.

The device used in this experiment did not contain an electrical enclosure 103. It had an enclosure 104 containing an electronic module connected by cable 105 to an insulating collar 107 that contained a conductive surface 109. The insulating collar 107 was mounted approximately one foot from the top of the pole 102. The pole 102 was shaped with a flat top and a conical lower end. The enclosure 104 was mounted on the top of the pole 102. An unpainted aluminum pole approximately four inches in diameter and approximately 42 inches long was used. A section of the unpainted pole 102 was used as a conductive ring 108. This assembly was placed in a fire ant mound measuring approximately 12 inches in diameter and approximately 2 inches high. The device was operated for approximately 4 hours. Fire ants were observed to climb up the pole and cluster around the gap between the conductive surface 109 and the insulating collar 107 that contained a conductive surface 109. These fire ants were observed to receive stimulation for varying amounts of time around a few seconds to as long as 30 seconds before falling to the ground. None of the ants attempting to climb the pole 102 were able to reach the area above the insulating collar.

What is claimed is:

1. An apparatus for preventing fire ants from gaining access to a select area having a defined access path, comprising:

means for providing a low impedance electrical stimulating source in the defined access path that, when activated, attracts fire ants to contact the stimulating source and become agitated to a point that ants from a common colony attack each other; and means for activating the low impedance electrical stimulating source to cause the fire ants to cluster around and contact the electrical stimulating source such that current passes through the fire ants, the fire ants becoming agitated as a result of the contact with the electrical stimulating source, such that the fire ants fall away from the electrical stimulating source and away from the select area;

wherein said electrical stimulating source has an amplitude that is low enough not to kill the ants or harm other beings;

wherein the low impedance electrical stimulating source is an AC electrical source operating at a predetermined nominal frequency that varies as a function of load across the access path.

2. The apparatus of claim 1, wherein said low impedance electrical stimulating source is applied across an electrically conductive base and at least one conductive surface that is electrically insulated from the conductive base and in close proximity to the base.

3. The apparatus of claim 2, wherein said conductive base is located in ground-mounted equipment.

4. The apparatus of claim 2, wherein said conductive base is located in pole-mounted equipment.

5. The apparatus of claim 1, wherein said low impedance electrical stimulating source is applied across at least two electrically conductive surfaces that are insulated from each other and in close proximity to each other.

6. The apparatus of claim 5, wherein said at least two electrically conductive surfaces are located in ground-mounted equipment.

7. The apparatus of claim 5, wherein said at least two electrically conductive surfaces are located in pole-mounted equipment.

8. The apparatus of claim 1, wherein said low impedance electrical stimulating source is activated on a substantially continuous basis.

9. An apparatus for preventing fire ants from gaining access to a select area having a defined path, comprising:

means for providing a low impedance electrical stimulating source in the defined access path that, when activated, attracts fire ants to contact the stimulating source and become agitated to a point that ants from a common colony attack each other; and means for activating the low impedance electrical stimulating source to cause the fire ants to cluster around and contact the stimulating source such that current passes through the fire ants, the fire ants becoming agitated as a result of the contact with the electrical stimulating source, such that the fire ants fall away from the stimulating source and away from the select area;

wherein said stimulating source is an AC voltage, whose amplitude is low enough not to kill the ants or harm other beings, but high enough to disrupt the nervous systems of the ants to the extent that they attack one another;

wherein the low impedance electrical stimulating source operates at a predetermined nominal frequency that varies as a function of load across the access path.

10. A method for preventing fire ants from gaining access to a select area having a defined access path, comprising the steps of:

disposing a low impedance electrical stimulating source in the defined access path that, when activated, will attract fire ants to contact the electrical stimulating source and become agitated to the point that ants from a common colony will attack each other; and activating the low impedance electrical stimulating source to cause the fire ants to cluster around and contact the electrical stimulating source such that current passes through the fire ants, the fire ants becoming agitated as a result of the contact with the electrical stimulating source, such that the fire ants fall away from the electrical stimulating source and away from the select area;

wherein said electrical stimulating source has an amplitude that is low enough not to kill the ants or harm other beings;

wherein the low impedance electrical stimulating source is an AC electrical source operating at a predetermined nominal frequency that varies as a function of load across the access path.

11. The method of claim 10, wherein said low impedance electrical stimulating source is activated on a substantially continuous basis.

12. A method for preventing fire ants from gaining access to a select area having a defined access path, comprising the steps of:

disposing a low impedance electrical stimulating source in the defined access path that, when activated, will attract fire ants to contact the stimulating source and become agitated to a point that ants from a common colony will attack each other; and activating the low impedance electrical stimulating source to cause the fire ants to cluster around and contact the stimulating source such that current passes through the fire ants, the fire ants becoming agitated as a result of the contact with the electrical stimulating source, such that the fire ants fall away from the stimulating source and away from the select area;

wherein said stimulating source is an AC voltage, whose amplitude is low enough not to kill the ants or harm other beings, but high enough to disrupt the nervous systems of the ants to the extent that they attack one another;

wherein the low impedance electrical stimulating source is an AC electrical source operating at a predetermined nominal frequency that varies as a function of load across the access path.

* * * * *